United States Patent
Choi et al.

(10) Patent No.: US 10,760,421 B2
(45) Date of Patent: Sep. 1, 2020

(54) COMPRESSOR AND GAS TURBINE INCLUDING THE SAME

(71) Applicant: DOOSAN HEAVY INDUSTRIES & CONSTRUCTION CO., LTD., Changwon-si, Gyeongsangnam-do (KR)

(72) Inventors: Jaewoo Choi, Yangsan-si (KR); Youngjin Jung, Pyeongtaek-si (KR)

(73) Assignee: Doosan Heavy Industries Contruction Co., Ltd, Gyeongsangnam-do (KR)

( * ) Notice: Subject to any disclaimer, the term of this patent is extended or adjusted under 35 U.S.C. 154(b) by 184 days.

(21) Appl. No.: 16/026,072

(22) Filed: Jul. 3, 2018

(65) Prior Publication Data
US 2019/0085697 A1 Mar. 21, 2019

(30) Foreign Application Priority Data
Sep. 21, 2017 (KR) .......................... 10-2017-0122024

(51) Int. Cl.
*F01D 1/04* (2006.01)
*F01D 9/04* (2006.01)
(Continued)

(52) U.S. Cl.
CPC ................ *F01D 1/04* (2013.01); *F01D 9/04* (2013.01); *F04D 27/0253* (2013.01);
(Continued)

(58) Field of Classification Search
CPC ... F01D 1/04; F01D 9/04; F01D 25/12; F04D 29/541; F04D 29/667; F05D 2240/12;
(Continued)

(56) References Cited

U.S. PATENT DOCUMENTS 2,879,936 A * 3/1959 Faught ..................... F02C 7/05
415/121.2
6,914,344 B2 * 7/2005 Franchet ................ F01D 15/10
290/40 C
(Continued)

FOREIGN PATENT DOCUMENTS

GB 663194 A * 12/1951 ................ F02C 7/05
JP 2002-174426 A 6/2002
(Continued)

OTHER PUBLICATIONS

Korean Office Action dated Jun. 18, 2018 in connection with Korean Patent Application No. 10-2017-0122024.

Primary Examiner — Moshe Wilensky
Assistant Examiner — Christopher R Legendre
(74) Attorney, Agent, or Firm — Invenstone Patent, LLC

(57) ABSTRACT

A compressor includes a compressor screen mounted on the outer circumferential surface of a compressor disk or the inner wall of a compressor casing. The compressor screen is positioned between a row of compressor blades and a row of compressor vanes to stabilize airflow by regulating the amount of air flowing in the compressor. The compressor screen is formed of annular plate having openings through which the compressed air flows, arranged in a pattern to smoothly regulate the flow of air. The compressor screen may be variously configured, for example, to facilitate installation or to guide the flow of air using a tapered surface or a directionality of the openings or a flow guide. A gas turbine includes a combustor, a turbine, and a compressor employing the compressor screen.

20 Claims, 14 Drawing Sheets

(51) Int. Cl.
*F04D 29/54* (2006.01)
*F04D 27/02* (2006.01)
*F04D 29/66* (2006.01)
*F02C 7/05* (2006.01)

(52) U.S. Cl.
CPC ......... *F04D 29/541* (2013.01); *F04D 29/667* (2013.01); *F02C 7/05* (2013.01); *F05D 2220/3216* (2013.01); *F05D 2240/12* (2013.01); *F05D 2250/141* (2013.01); *F05D 2250/191* (2013.01); *F05D 2260/60* (2013.01); *F05D 2270/10* (2013.01)

(58) Field of Classification Search
CPC ......... F05D 2250/141; F05D 2250/191; F05D 2260/60; F05D 2270/10; F02C 7/05; F02C 7/052; F02C 7/055
See application file for complete search history.

(56) References Cited

U.S. PATENT DOCUMENTS

2016/0061049 A1* 3/2016 Playford ............... F01D 11/122
415/9
2019/0085697 A1* 3/2019 Choi ................... F04D 27/0253

FOREIGN PATENT DOCUMENTS

| KR | 10-2001-0076202 A | 8/2001 |
| KR | 10-2005-0046724 A | 5/2005 |
| KR | 10-2005-0060000 A | 6/2005 |
| KR | 10-1546602 B1 | 8/2015 |

\* cited by examiner

COMPRESSOR AND GAS TURBINE INCLUDING THE SAME

CROSS-REFERENCE TO RELATED APPLICATIONS

This application claims priority to Korean Patent Application No. 10-2017-0122024, filed on Sep. 21, 2017, the disclosure of which is incorporated herein by reference in its entirety.

BACKGROUND OF THE INVENTION

Field of the Invention

The present disclosure relates to a compressor and a gas turbine including the same, and more particularly, to a compressor of a gas turbine employing a compressor screen in stabilizing airflow in the compressor.

Description of the Related Art

A gas turbine is a power engine that mixes air compressed in a compressor with fuel for combustion and uses high-temperature gas generated by the combustion to rotate a turbine. Gas turbines may be used as a power source to drive a generator, an aircraft, a ship, a train, and the like.

Such a gas turbine generally includes a compressor, a combustor, and a turbine. The compressor sucks and compresses outside air, and then transmits it to the combustor. The air compressed in the compressor is in a high-pressure and high-temperature state. The combustor mixes fuel with the compressed air introduced from the compressor and combusts the mixture. Combustion gas generated by the combustion is discharged to the turbine. Turbine blades in the turbine are rotated by the combustion gas, thereby generating power. The generated power is used in various fields, such as generating electric power and driving large machines.

However, air introduced to a compressor may increase in pressure while flowing in the compressor, such that leaks may occur due to a difference in pressure. The leakage of compressed air may degrade compressor performance and overall gas turbine performance.

SUMMARY OF THE INVENTION

Accordingly, it is an object of the present disclosure to provide a compressor capable of stabilizing airflow by regulating the amount of air flowing in the compressor.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a compressor may include a compressor casing in which a plurality of compressor disks are installed; a plurality of compressor blades fixed to an outer circumferential surface of each compressor disk so as to be arranged in rows facing an inner circumferential surface of the compressor casing; a plurality of compressor vanes fixed to the inner circumferential surface of the compressor casing and arranged in rows interlacing the compressor blades rows; and a compressor screen disposed between adjacently arranged rows of the compressor vanes and the compressor blades.

The compressor screen may include an annular plate through which a plurality of openings are formed according to a pattern. The openings may be formed obliquely to have directionality, and may increase in size toward a mounting surface for receiving the compressor screen. The compressor screen may include a flow guide formed on a downstream side of the compressor screen, the flow guide extending from an edge of each opening to direct a flow of compressed air.

The compressor screen may be formed of a plurality of segments arranged around a hollow of the compressor screen; may include a base portion having a rounded surface, such that the base portion is thicker than an end portion of the compressor screen; may include includes an end portion tapered on an upstream side of the compressor screen; and may include a circumferential surface mounted on one of the outer circumferential surface of the compressor disk and an inner wall of the compressor casing.

The compressor screen may be fixed to the compressor casing; may have a radial width smaller than a length of an adjacent compressor vane; may have an inner periphery tapered in a flow direction of air; may include a plurality of segments respectively installed on the inner wall of the compressor casing; and may include an annular plate through which a plurality of openings are formed according to a pattern, the openings increasing in size toward an outer periphery of the compressor screen.

Alternatively, the compressor screen may be fixed to the compressor disk; may have a radial width smaller than a length of an adjacent compressor blade; may have an outer periphery tapered in a flow direction of air; may include a plurality of segments installed on the outer circumferential surface of the compressor disk; and may include an annular plate through which a plurality of openings are formed according to a pattern, the openings increasing in size toward an inner periphery of the compressor screen.

In accordance with another aspect of the present disclosure, a gas turbine may include the above compressor; a combustor configured to mix compressed air introduced from the compressor with fuel for combustion; and a turbine configured to rotate by combustion gas generated in the combustor to generate power.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
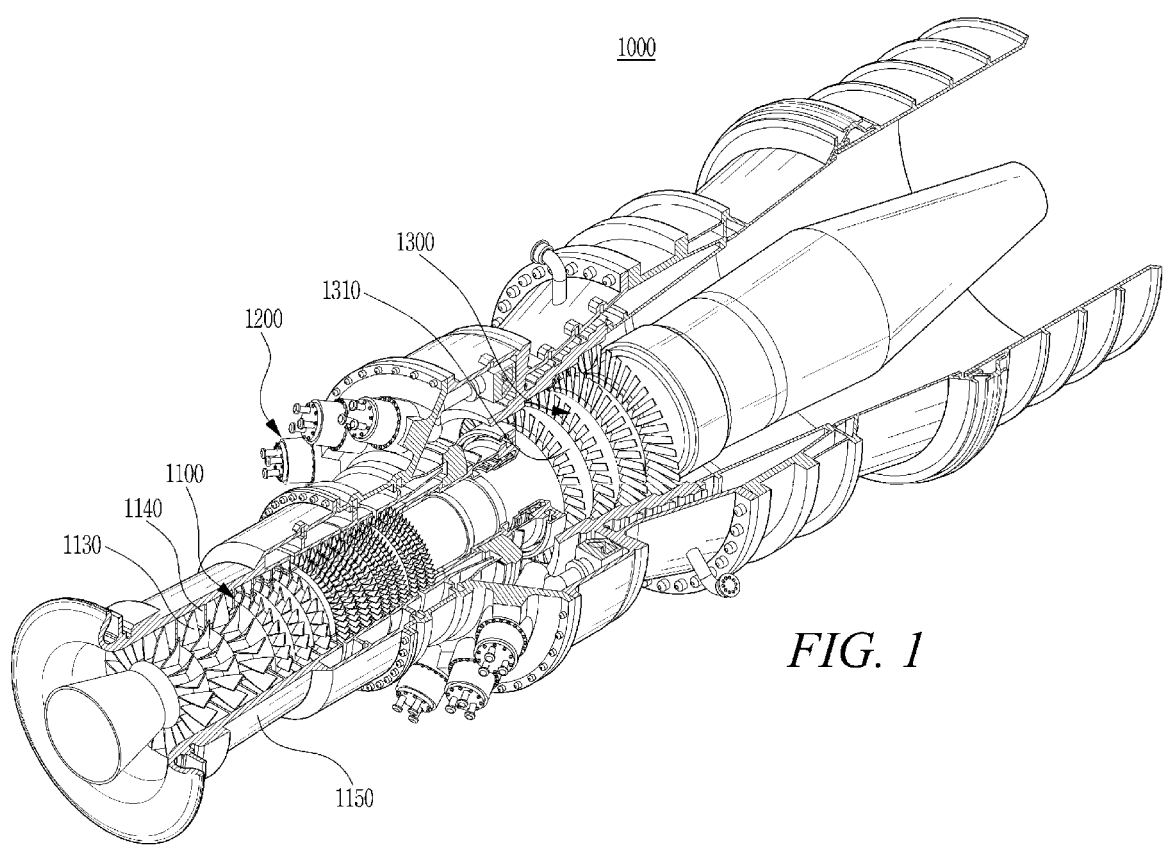
FIG. 1 is a cutaway perspective view of the interior of a gas turbine according to an embodiment of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
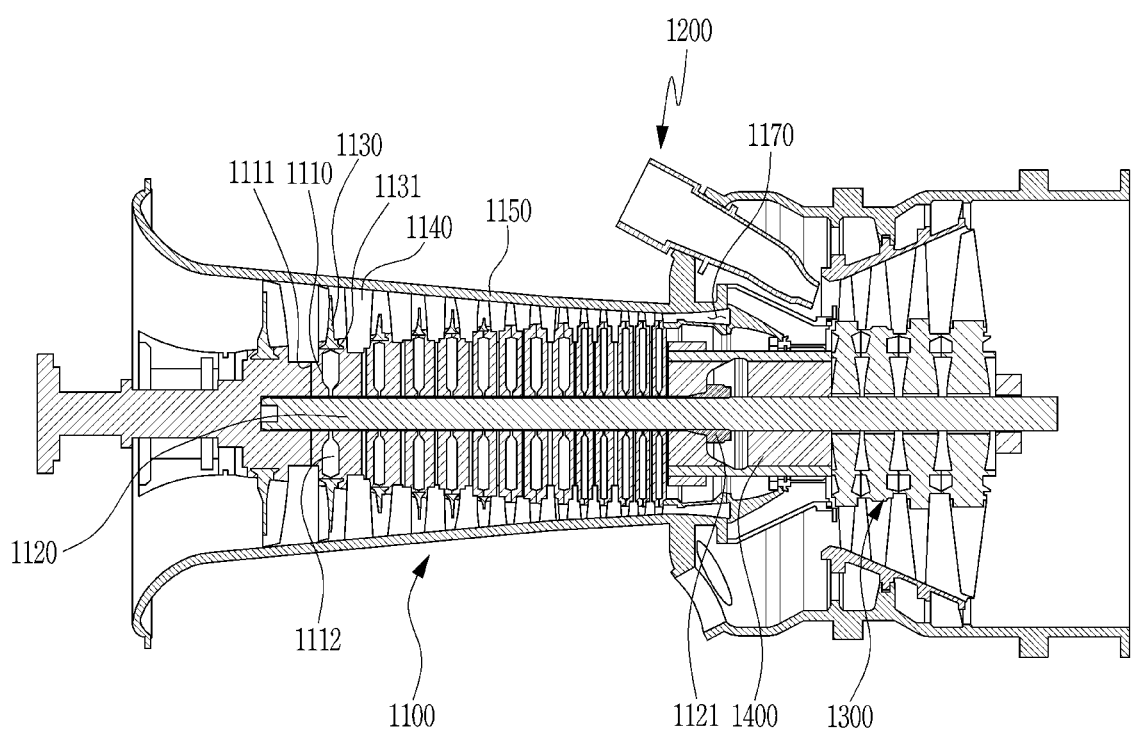
FIG. 2 is a cross-sectional view conceptually illustrating a gas turbine according to the present disclosure.
Figure 3:
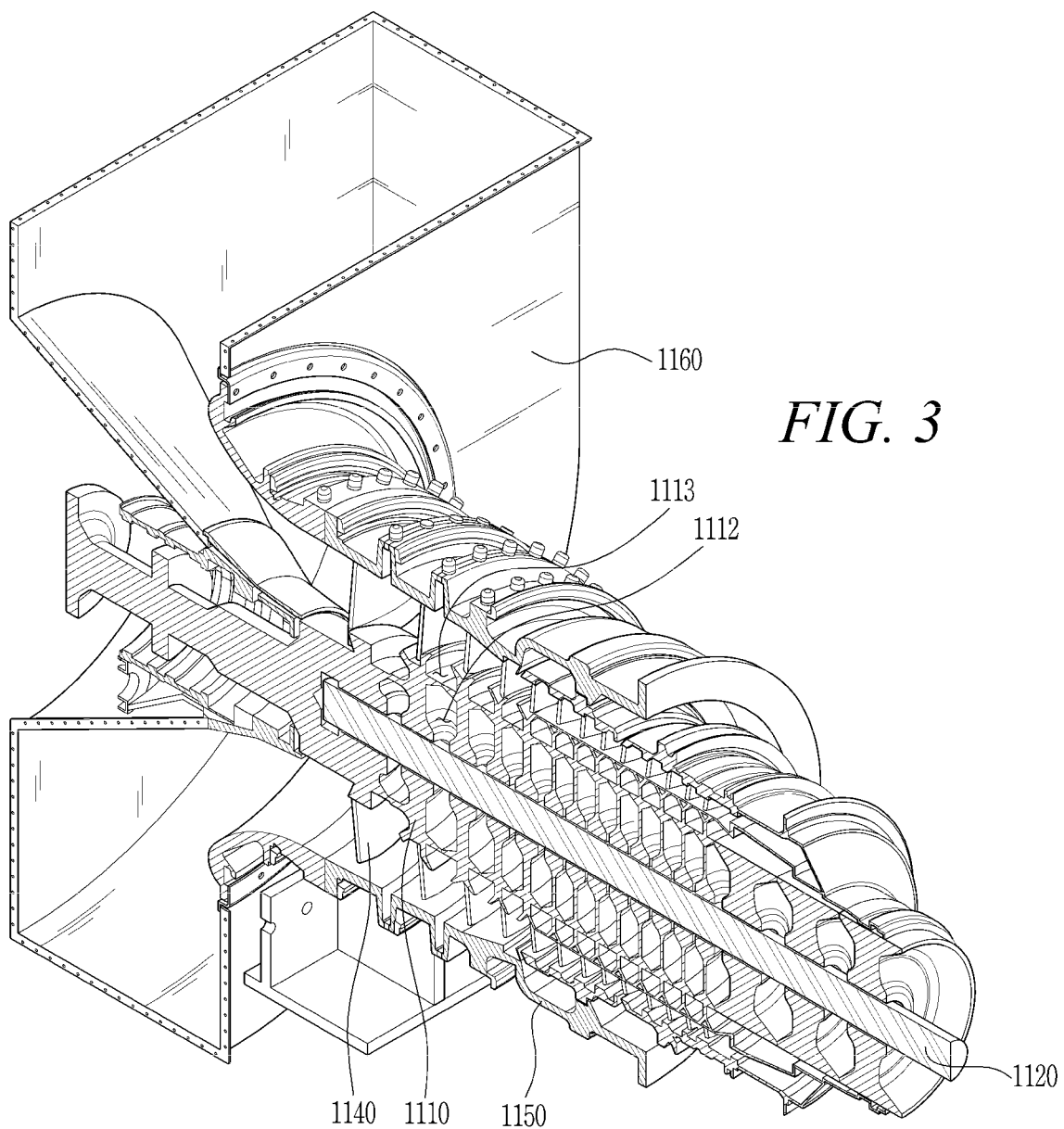
FIG. 3 is a cutaway perspective view of a compressor according to an embodiment of the present disclosure.

FIGS. 1 and 2 are views of a gas turbine according to an embodiment of the present disclosure, and FIG. 3 shows a compressor according to an embodiment of the present disclosure.

Referring to FIGS. 1-3, a gas turbine 1000 according to the embodiment of the present disclosure may include a compressor 1100, a combustor 1200, and turbine 1300. The compressor 1100 sucks and compresses outside air, and the combustor 1200 mixes air compressed in the compressor 1100 with fuel for combustion. Turbine blades 1310, provided in the turbine 1300, are rotated by the combustion gas discharged from the combustor 1200.

The compressor 1100 may include a plurality of compressor disks 1110, a plurality of compressor blades 1130, a plurality of compressor vanes 1140, a compressor casing 1150, and a compressor screen (to be described later). The plurality of compressor blades 1130 are arranged in rows inside the compressor casing 1150; likewise, the plurality of compressor vanes 1140 are arranged in rows inside the compressor casing 1150, such that the rows of compressor vanes 1140 and the rows of compress blades 1130 are interlaced.

Each compressor disk 1110 has an outer circumferential surface to which the compressor blades 1130 are fixed. The compressor blades 1130 are rotated as the compressor disks 1110 rotate in unison along with the rotation of a tie rod 1120 passing through the center of each compressor disk 1110. The plurality of compressor disks 1110 are axially fastened together by the tie rod 1120 so as not to be axially spaced apart from each other and are individually aligned, axially, by the tie rod 1120 passing therethrough. Each compressor disk 1110 may have a plurality of protrusions (not shown) formed on an outer circumference and may have a flange 1111 for coupling to an adjacent compressor disk 1110 for their mutual rotation.

A compressor disk cooling passage 1112 may be formed in at least one of the plurality of compressor disks 1110. The air compressed by the compressor blades 1130 rotating in the compressor 1100 may move through the compressor disk cooling passage 1112 to the turbine 1300 to cool the turbine blades 1310.

The tie rod 1120 receives torque generated in the turbine 1300 to rotate the compressor disks 1110. To this end, a torque tube 1400 may be arranged between the compressor 1100 and the turbine 1300 and may be a torque transmission member that transmits the rotational torque generated in the turbine 1300 to the compressor 1100.

One end of the tie rod 1120 is fastened to a compressor disk positioned at the most upstream side, and the other end is inserted into the torque tube 1400 and fastened to a pressure nut 1121 in the torque tube 1400. The pressure nut 1121 pressurizes the torque tube 1400 toward the compressor disks 1110 so that the individual compressor disks 1110 are pressed against each other.

The compressor blade 1130, which is radially coupled to the outer circumferential surface of each of the compressor disks 1110, may consist of a plurality of compressor blades and may be a multistage compressor blade. Each compressor blade 1130 may have a compressor blade root member 1131, which is inserted into a compressor disk slot 1113 provided in the compressor disk 1110, to fix the compressor blade 1130 to the compressor disk 1110.

The compressor blades 1130 rotate along with the rotation of the compressor disks 1110 to compress air introduced thereinto while moving compressed air toward a rearwardly disposed (downstream) compressor vane 1140. Air is compressed at increasing pressure as it passes through the multistage compressor blade 1130.

The compressor vane 1140 is fixed to an inner circumferential surface of the compressor casing 1150, and may consist of a plurality of compressor vanes that form a stage. The compressor vane 1140 guides compressed air from an upstream compressor blade 1130 to a downstream compressor blade 1130. In an example, at least some of the plurality of compressor vanes 1140 may be mounted to be rotatable within a fixed range for regulating an inflow rate of air or the like.

The compressor casing 1150 defines an external appearance of the compressor 1100 and accommodates the compressor disk 1110, the tie rod 1120, the compressor blade 1130, the compressor vane 1140, etc. The compressor casing 1150 may have a connection pipe (not shown) formed therein to move air compressed in several stages by the multistage compressor blade 1130 to the turbine 1300 for cooling the turbine blades.

The compressor 1100 may include an intake 1160 and a compressor diffuser 1170. The intake 1160 is positioned at the inlet of the compressor 1100. The intake 1160 is used to introduce outside air into the compressor 1100. The compressor diffuser 1170 is located at the outlet of the compressor 1100 to diffuse and move compressed air. The compressor diffuser 1170 rectifies compressed air before the air compressed in the compressor 1100 is supplied to the combustor 1200, and converts some of kinetic energy of compressed air into a static pressure. The compressed air passing through the compressor diffuser 1170 is introduced into the combustor 1200.

Figure 4:
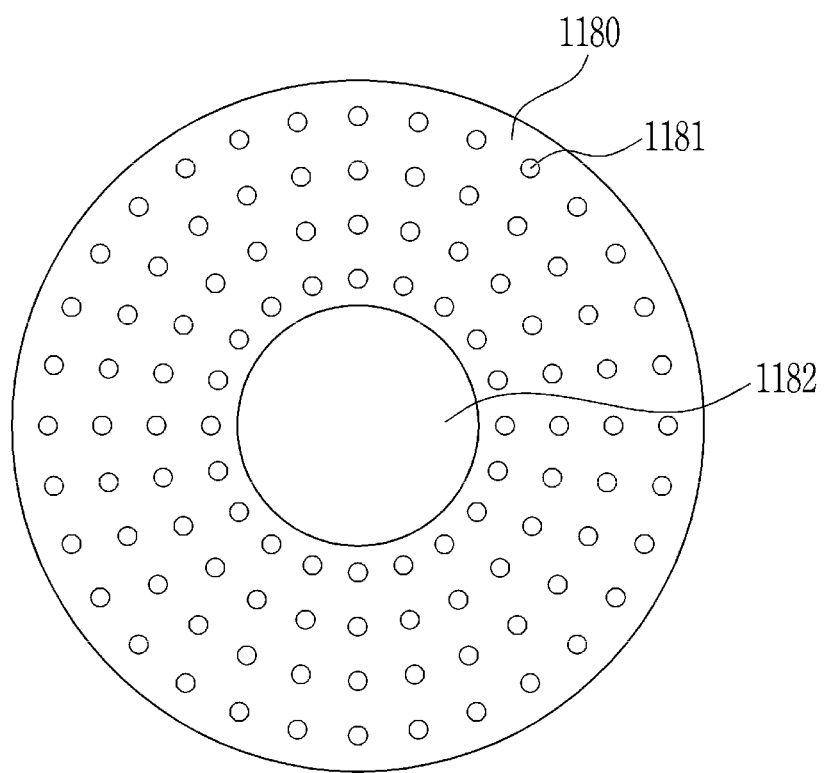
FIG. 4 is a plan view of a compressor screen of the compressor according to the embodiment of the present disclosure.

Referring to FIG. 4, a compressor screen 1180 in accordance with the embodiment of the present disclosure is configured as an annular plate having a hollow 1182 formed at the center of the plate, for accommodating the compressor disk 110, and a plurality of openings 1181 formed in the plate around the hollow 1182. Compressed air passes through the compressor screen 1180 by passing through the openings 1181. The openings 1181 are formed in the compressor screen 1180 by an interspersion of openings over an area extending from the hollow 1182 to the plate's periphery according to, for example, a regular pattern. For smooth flow of compressed air, the area covered by the openings 1181 may be at least 80% of the total area of the compressor screen 1180. The compressor screen 1180 may be made of steel or a similar material and may have a predetermined thickness of, for example, 1 to 3 cm.

Figure 5:
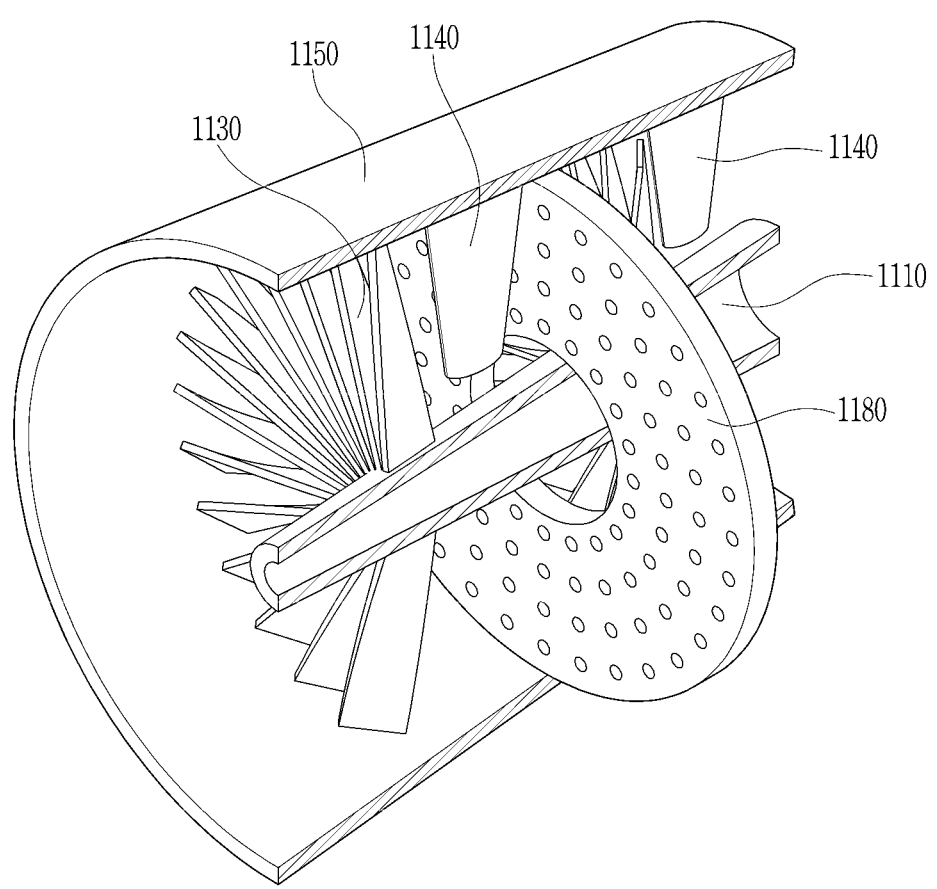
FIG. 5 is a cutaway perspective view of the compressor screen mounted in a compressor casing of a compressor according to one embodiment of the present disclosure.
Figure 6A:
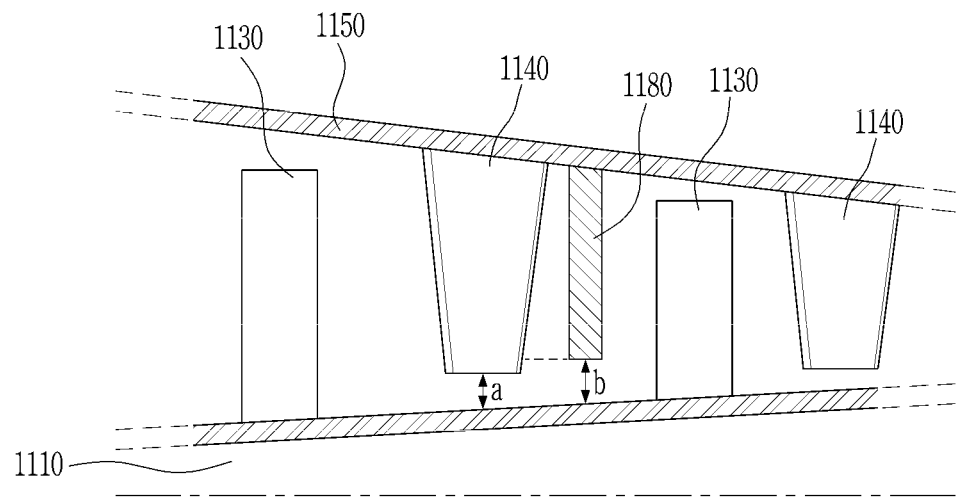
FIGS. 6A and 6B are axial cross-sectional views for schematically illustrating a state in which the compressor screen is mounted according to the embodiment of FIG. 5, in which the relationship between opposing surfaces of the compressor casing and compressor disks is exaggerated for illustrative purposes.
Figure 6B:
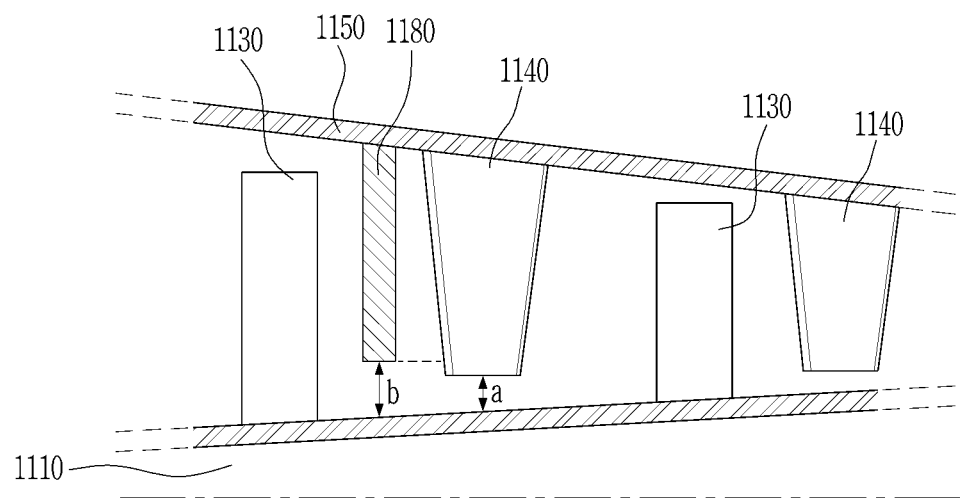

FIG. 5 and FIGS. 6A and 6B show the compressor screen 1180 installed inside the compressor casing 1150 of the compressor 1100 according to one embodiment. Here, the compressor screen 1180 is mounted, circumferentially, on an inner wall of the casing 1150, using a circumferential surface in the form of an outer periphery of the compressor screen 1180.

Referring to FIG. 5, showing the compressor screen 1180 mounted inside the compressor casing 1150 of the compressor 1100 according to one embodiment, the compressor screen 1180 may be circumferentially mounted to an inner wall of the compressor casing 1150. The compressor screen 1180 is disposed between the compressor blade 1130 and the compressor vane 1140, specifically between a row of the compressor blades 1130 and an adjacent row of the compressor vanes 1140, so as not to interfere with the compressor blade 1130 and the compressor vane 1140. Thus disposed, the compressor screen 1180 allows the air compressed by the compressor blade 1130 to pass through the openings 1181 of the compressor screen 1180 and through the hollow 1182, specifically, through a gap between the compressor disk 1110 and the inner edge of the hollow 1182, and thereby regulates the flow of the compressed air.

Referring to FIGS. 6A and 6B, the compressor screen 1180 is disposed between the compressor vane 1140 and the compressor blade 1130, shown on one side or the other of a juxtaposed compressor vane. Accordingly, the compressor screen 1180 is disposed between adjacently arranged rows of the compressor vanes 1140 and the compressor blades 1130.

The compressed air guided by the compressor vane 1140 passes through the compressor screen 1180 and is then compressed by the next compressor blade 1130. The compressor screen 1180 is smaller (shorter) than the compressor vane 1140, having a radial width smaller than a length of an adjacent compressor vane, such that the compressed air guided by the compressor vane 1140 smoothly passes through the compressor screen 1180. That is, as shown in each of FIGS. 6A and 6B, the distance (b) between and the compressor disk 1110 and an inner circumference of the compressor screen 1180, i.e., at the hollow 1182, is greater than the distance (a) between and the compressor disk 1110 and the compressor vane 1140. If compressor disk 1110 is positioned such that the space between the compressor disk 1110 and the compressor screen 1180 is too small, the flow of compressed air may become blocked or interrupted. Sufficient spacing between the compressor disk 1110 and the compressor screen 1180 may ensure the smooth flow of compressed air. In order to prevent compressed air from leaking, the compressor blade 1130 is designed to have a minimum distance from the inner wall of the compressor casing 1150 when the compressor disk 1110 rotates at maximum speed. Leakage can be prevented in the present embodiment since the compressor screen 1180 is mounted to the inner wall of the compressor casing 1150.

The compressor screen 1180 may consist of one or more compressor screens mounted in the compressor, and may be variously configured according to the desired flow of compressed air.

Figure 7:
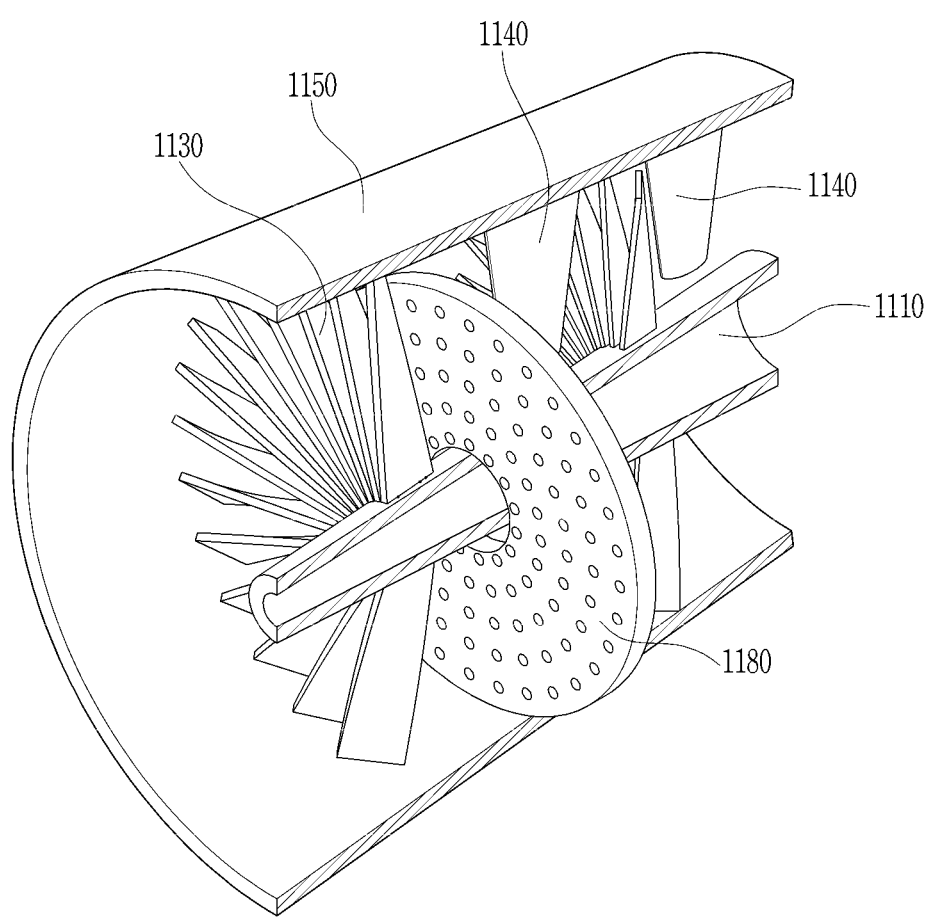
FIG. 7 is a cutaway perspective view of the compressor screen mounted in a compressor casing of a compressor according to another embodiment of the present disclosure.
Figure 8A:
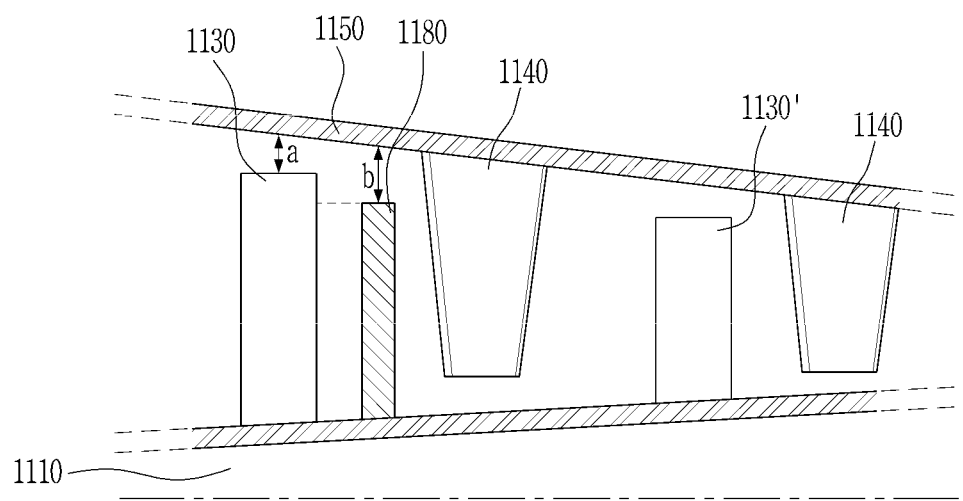
FIGS. 8A and 8B are axial cross-sectional views for schematically illustrating a state in which the compressor screen is mounted according to the embodiment of FIG. 7, in which the relationship between opposing surfaces of the compressor casing and compressor disks is exaggerated for illustrative purposes.
Figure 8B:
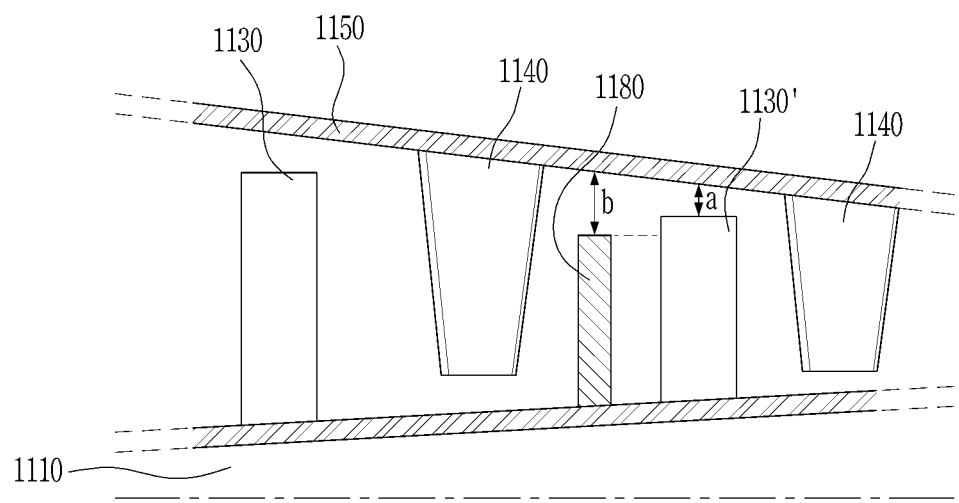

FIG. 7 and FIGS. 8A and 8B show the compressor screen 1180 installed inside the compressor casing 1150 of the compressor 1100 according to another embodiment, wherein the compressor screen 1180 is mounted, circumferentially, on an outer circumferential surface of the compressor disk 1110. That is, in another example according to the present disclosure, the compressor screen 1180 has a circumferential surface (an inner periphery) that may be fixed to the compressor disk 1110 rather than to the casing 1150.

Referring to FIG. 7, the compressor screen 1180 is mounted on the compressor disk 1110 and is disposed between a row of the compressor blades 1130 and a row of the compressor vanes 1140. Thus disposed, the compressor screen 1180 allows the air compressed by the compressor blade 1130 to pass through the openings 1181 and through a space between an inner wall of the casing 1150 and the outer periphery of the compressor screen 1180, and thereby regulates the flow of the compressed air.

Referring to FIGS. 8A and 8B, the compressor screen 1180 is disposed between the compressor blade 1130 and the compressor vane 1140, shown on one side or the other of a juxtaposed compressor blade. Accordingly, in this embodiment, the compressor screen 1180 is similarly disposed between adjacently arranged rows of the compressor vanes 1140 and the compressor blades 1130.

Here, as shown in FIG. 8A, the air compressed by the compressor blade 1130 passes through the screen 1180 and is then guided by the next compressor vane 1140. The compressor screen 1180 is smaller (shorter) than the compressor blade 1130, having a radial width smaller than a length of an adjacent compressor blade, for smoothly passing the air compressed by the compressor blade 1130. That is, as shown in each of FIGS. 8A and 8B, the distance (b) between and the compressor casing 1150 and an outer circumference of the compressor screen 1180 is greater than the distance (a) between and the compressor disk 1110 and the compressor vane 1140. If compressor casing 1150 is positioned such that the space between the compressor casing 1150 and the compressor screen 1180 is too small, the flow of compressed air may become blocked or interrupted. Sufficient spacing between the compressor casing 1150 and the compressor screen 1180 may ensure the smooth flow of compressed air.

FIGS. 9A and 9B and FIGS. 10A and 10B show alternative configurations of the compressor screen 1180, including embodiments based on the pattern of openings 1181 and a division of the compressor screen 1180 into plural segments arranged around the hollow 1182.

Figure 9A:
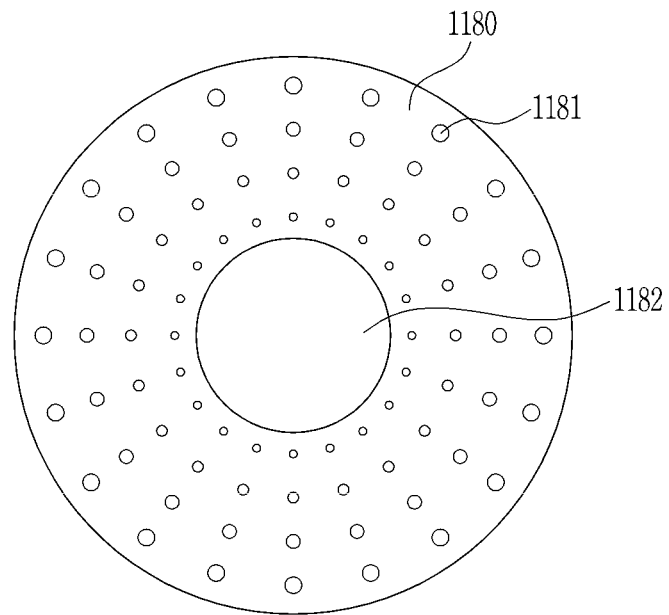
FIGS. 9A and 9B are plan views of a compressor screen of the compressor, each illustrating a patterning of the openings according to an embodiment of the present disclosure.
Figure 9B:
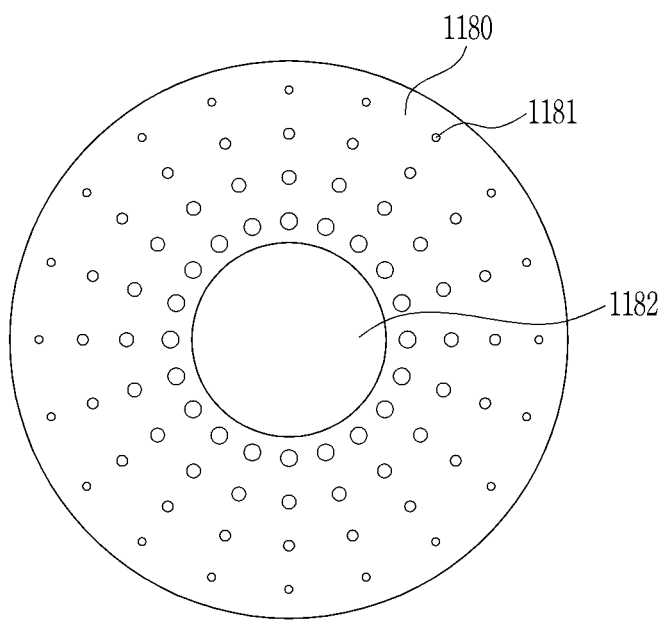
Figure 10A:
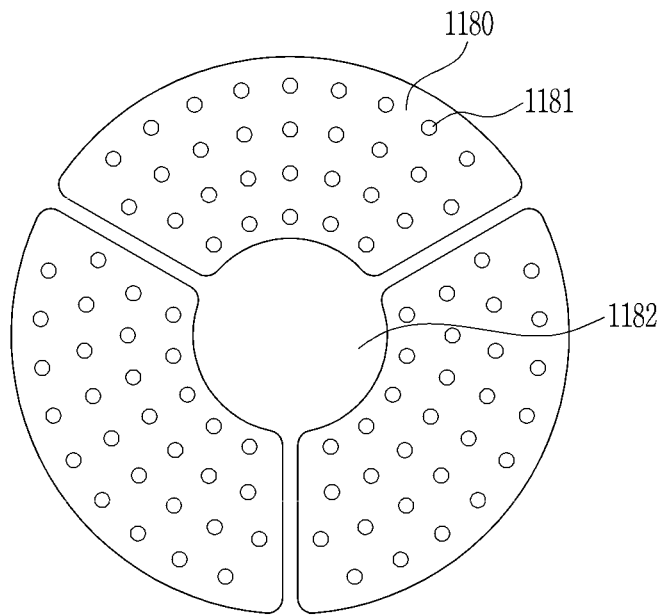
FIGS. 10A and 10B are plan views of a compressor screen of the compressor, each illustrating a segmentation of the compressor screen according to an embodiment of the present disclosure.
Figure 10B:
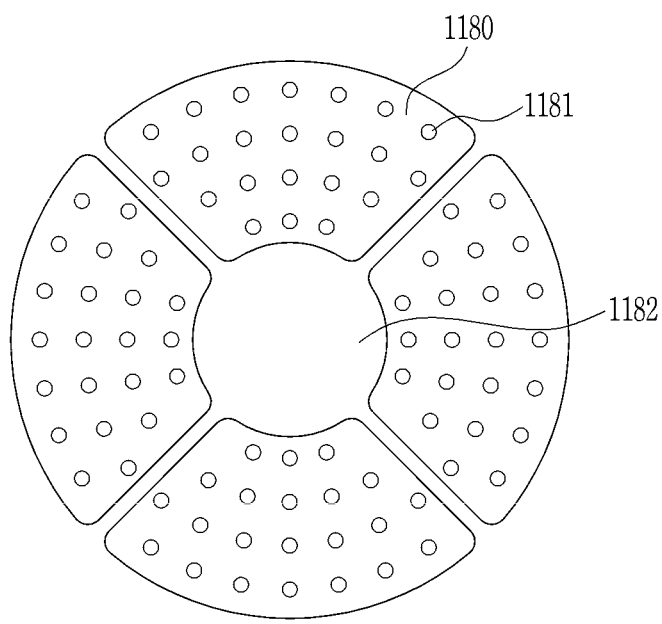

Referring to FIGS. 9A and 9B, a plurality of openings 1181 formed in a compressor screen 1180 may have a predetermined pattern. The openings 1181 may be designed to have different patterns according to the position of the compressor screen 1180 with respect to an adjacent blade or vane. When a compressor blade 1130 is positioned in front of the compressor screen 1180 and a compressor vane 1140 is positioned behind the compressor screen 1180 with respect to the flow direction of air, namely, when the compressor screen 1180 is positioned between the compressor blade 1130 and the compressor vane 1140 in the flow direction of air, the openings 1181 may be patterned to have a radius increased toward a compressor disk 1110, namely, in an axial direction. The sizes of the openings 1181 are increased toward the central axis of the compressor screen, thereby enabling air to flow in the direction of the central axis. In this case, more compressed air flows in a space defined by the tip of the compressor vane 1140 and the compressor disk 1110.

On the contrary, when the compressor vane 1140 is positioned in front of the compressor screen 1180 and the compressor blade 1130' is positioned behind the compressor screen 1180, namely, when the compressor screen 1180 is positioned between the compressor vane 1140 and the compressor blade 1130' in the flow direction of air, the openings 1181 may be formed to have a radius increased toward the inner wall of the compressor casing 1150. The sizes of the openings 1181 are increased radially outward of the compressor screen, thereby enabling air to flow toward the inner wall of the compressor casing 1150. In this case, more compressed air flows in a space defined by the tip of the compressor blade 1130 and the inner wall of the compressor casing 1150. Although the openings have a pattern varying in the radial direction in the present embodiment, the pattern of the openings 1181 may also vary in the circumferential direction as occasion demands. The flow of air may be regulated in different directions according to the pattern of the openings 1181.

In each of FIGS. 9A and 9B, the openings 1181 of the compressor screen 1180 are arranged with increasing size (diameter) from an end portion of the compressor screen 1180, over which compressed air flows, toward a base portion of the compressor screen 1180, which is fixed to a mounting surface and feels less airflow. Here, the mounting surface for receiving the compressor screen 1180 may be that of the compressor casing 1150 (as in FIG. 5) or that of the compressor disk 1110 (as in FIG. 7).

In another example, the compressor screen 1180 may be formed of plural pieces or segments, which are separately formed. That is, though the compressor screen 1180 may be formed integrally, as in FIG. 4, it may also be formed of a plurality of discontinuous pieces, or segments, with consideration of the position of the compressor screen 1180 being fixed to the inner wall of the compressor casing 1150 or to an outer circumference of the compressor disk 1110. For example, the compressor screen 1180 may be formed of three (FIG. 10A) or four (FIG. 10B) separate formed segments. When the compressor screen 1180 is divided into a plurality of segments, it is advantageous that the compressor screen is easily installed in the compressor 1100. The plurality of segments forming the compressor screen 1180 are arranged at regular intervals.

When the compressor screen 1180 is mounted on a surface of the compressor casing 1150, compressed air may flow through the space of the hollow 1182 between the compressor screen 1180 and the compressor disk 1110, through the spaces between the compressor screen segments, and through the openings 1181. On the other hand, when the compressor screen 1180 is mounted on a surface of the compressor disk 1110, compressed air may flow through the space between the outer periphery of the compressor screen 1180 and the compressor casing 1150, through the spaces between the compressor screen segments, and through the openings 1181. Various configurations of the compressor screen 1180, including its installation position, pattern of openings, and segmentation, enable control of the amount and direction of air flowing in the compressor as desired.

Further configurations of the compressor screen 1180 according to embodiments of the present disclosure are shown in FIGS. 11A and 11B and FIGS. 12A and 12B. In each instance, the compressor screen 1180 includes an end portion 1184 extending from a base portion 1185. The end portion 1184 extends toward a space through which compressed air flows, and the base portion 1185 is fixed to one or the other of the compressor casing 1150 and the compressor disk 1110.

Figure 11A:
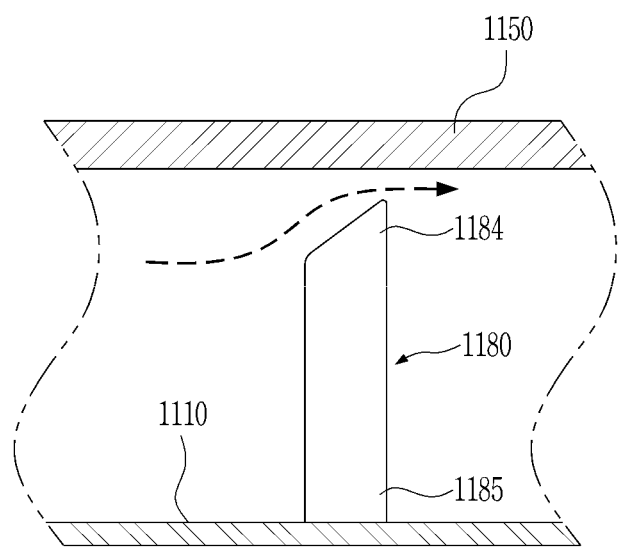
FIGS. 11A and 11B are cross-sectional side views of respective states of installation of a compressor screen in the compressor, each illustrating an end portion of the compressor screen according to an embodiment of the present disclosure.
Figure 11B:
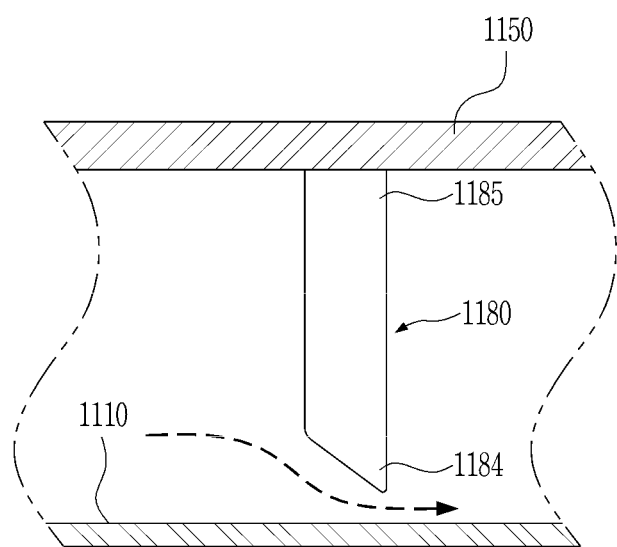
Figure 12A:
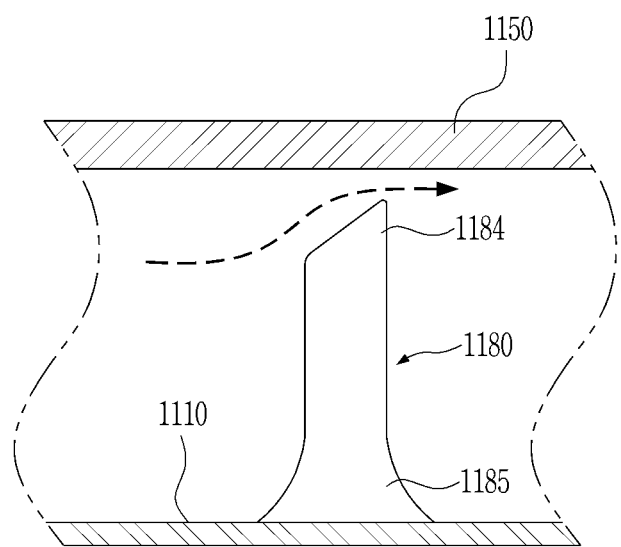
FIGS. 12A and 12B are cross-sectional side views of respective states of installation of a compressor screen in the compressor, each illustrating a base portion of the compressor screen according to an embodiment of the present disclosure.
Figure 12B:
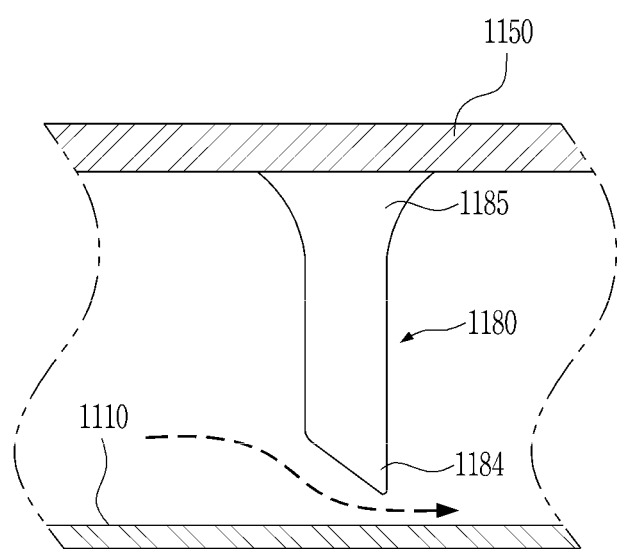

The end portion 1184 of the compressor screen 1180 may be a radially outer end (outer periphery) as in FIGS. 11A and 12A or a radially inner end (inner periphery) as in FIGS. 11B and 12B. In either case, the end portion 1184 of the compressor screen 1180 is tapered on the upstream side of the compressor screen 1180, that is, in the flow direction of air.

As illustrated in FIG. 11A, the end (inner periphery) of the compressor screen 1180 mounted to the inner wall of the compressor casing 1150 is directed to the compressor disk 1110. The inner periphery of the compressor screen 1180 is inclined downstream of the compressor 1100. Compressed air flows flexibly in the downstream direction by the inclination of the inner periphery of the compressor screen 1180.

In another example, as illustrated in FIG. 11B, the compressor screen 1180 is mounted to the outer peripheral surface of the compressor disk 1110. In this case, the compressor screen 1180 has a radially outer end (outer periphery) directed to the compressor casing 1150. The outer periphery of the compressor screen 1180 is inclined downstream of the compressor 1100. Compressed air flows flexibly in the downstream direction by the inclination of the outer periphery of the compressor screen 1180.

Meanwhile, the base portion 1185 of the compressor screen 1180 may have a rounded surface, such that a cross-sectional thickness of the compressor screen 1180 toward its mounting to the compressor disk 1110 (as in FIG. 12A) or to the compressor casing 1150 (as in FIG. 12B) is gradually increased. The compressor screen 1180 should withstand the pressure of compressed air that is strongly introduced thereinto. In addition, it is necessary to prevent formation of a region in which flowing compressed air strikes the compressor screen 1180 and the flow rate of compressed air is not uniform.

It is possible to secure durability since the compressor screen 1180 becomes thick toward the base portion thereof, and it is possible to prevent a non-uniform flow rate of compressed air since air flows along the curved surface of the compressor screen.

FIGS. 13A and 13B and FIGS. 14A and 14B show examples of the compressor screen 1180 in which a degree of airflow directionality is established for the air flowing through the openings 1181.

Figure 13A:
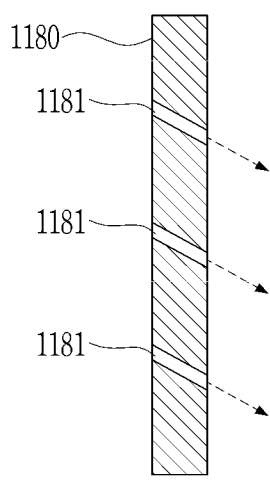
FIGS. 13A and 13B are cross-sectional side views of a compressor screen of the compressor, each illustrating obliquely formed openings according to an embodiment of the present disclosure.
Figure 13B:
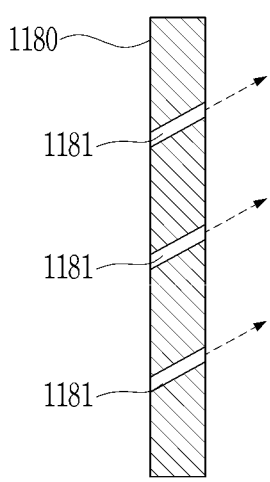

The openings 1181 formed in the compressor screen 1180 may be formed to have directionality by the thickness of the compressor screen 1180. That is, the thickness of the compressor screen 1180 may be utilized to impart directionality to the openings 1181 and, in turn, to the air flowing through the openings 1181. For example, as shown in FIG. 13A, downward airflow directionality may be achieved in each of the openings 1181 by their oblique formation to have a downward angle of inclination from the front surface (upstream side) to the rear surface (downstream side) of the compressor screen 1180. Here, the flow of compressed air is guided downward through the compressor screen 1180 in which is provided a relatively short passage according to the thickness of the compressor screen 1180 itself. Conversely, as shown in FIG. 13B, when the opening 1181 is formed obliquely upward from the rear surface, compressed air flows upward while passing through the compressor screen 1180. Thus, regulation of the flow of compressed air in a desired direction may be achieved.

Figure 14A:
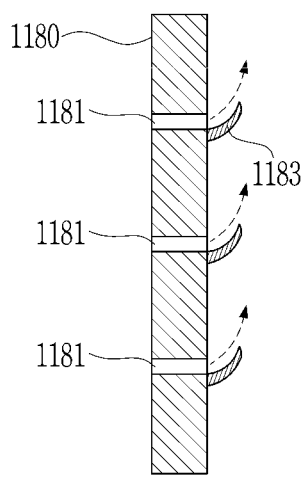
FIGS. 14A and 14B are cross-sectional side views of a compressor screen of the compressor, each illustrating a formation of flow guides according to an embodiment of the present disclosure.
Figure 14B:
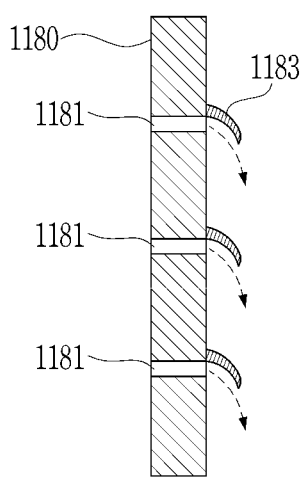

In another example, the compressor screen 1180 may further include a flow guide 1183 formed on a rear surface (downstream side). As illustrated in FIGS. 14A and 14B, each of a plurality of flow guides 1183 is formed on one side of a corresponding opening 1181 on the rear surface of the compressor screen 1180. The flow guide 1183 extends from an edge of the opening 1181, upward (FIG. 14A) or downward (FIG. 14A), in the direction of guiding the flow of air. Accordingly, the compressor screen 1180 including the flow guide 1183 can regulate the flow of compressed air in a desired direction.

As is apparent from the above description, the exemplary embodiments of the present disclosure can secure flow stability by controlling the flow of compressed air in the compressor of a gas turbine.

Although the present disclosure has been described with respect to the specific embodiments, it will be apparent to those skilled in the art that various variations and modifications may be made by adding, changing, or removing components without departing from the spirit and scope of the disclosure as defined in the following claims, and these variations and modifications fall within the spirit and scope of the as defined in the appended claims.

What is claimed is:

1. A compressor comprising:
   a compressor casing in which a plurality of compressor disks are installed;
   a plurality of compressor blades fixed to an outer circumferential surface of each compressor disk so as to be arranged in rows facing an inner circumferential surface of the compressor casing, the plurality of compressor blades configured to compress air flowing through the compressor, wherein at least one cooling passage formed in the plurality of compressor disks is in fluid communication with the compressed air;
   a plurality of compressor vanes fixed to the inner circumferential surface of the compressor casing and arranged in rows interlacing the compressor blades rows;
   a compressor screen that includes an annular plate disposed between adjacently arranged rows of the compressor vanes and the compressor blades; and
   a plurality of openings formed through the annular plate and configured to pass a portion of the compressed air from an upstream side of the compressor screen to a downstream side of the compressor screen.

2. The compressor according to claim 1,
   wherein the annular plate includes an inner periphery and an outer periphery; and
   wherein the plurality of openings are arranged according to a regular pattern that extends from the inner periphery to the outer periphery.

3. The compressor according to claim 1,
   wherein the annular plate includes a first surface disposed on the upstream side of the compressor screen and a second surface disposed on the downstream side of the compressor screen, each of the openings communicating with each of the first and second surfaces; and
   wherein the openings are formed obliquely from the downstream side to the upstream side and are configured to impart directionality to the compressed air passing through the openings.

4. The compressor according to claim 1, wherein the openings increase in size toward a mounting surface for receiving the compressor screen.

5. The compressor according to claim 1, wherein the compressor screen comprises a flow guide formed on the downstream side of the compressor screen, the flow guide extending from an edge of each opening to direct a flow of the compressed air.

6. The compressor according to claim 1,
   wherein the compressor screen includes a plurality of segments and an inner periphery surrounding a centrally disposed hollow portion of the compressor screen; and
   wherein the compressor screen is formed of the plurality of segments arranged around the inner periphery of the compressor screen.

7. The compressor according to claim 1, wherein the compressor screen includes a base portion having a rounded surface, such that the base portion is thicker than an end portion of the compressor screen.

8. The compressor according to claim 1, further comprising a mounting surface for receiving the compressor screen, wherein the compressor screen includes an end portion tapered on the upstream side of the compressor screen; and wherein the tapered end portion includes a tapered surface facing a flow direction of the compressed air and has a decreasing width in a radial direction of the compressor such that the tapered end portion is widest toward the mounting surface.

9. The compressor according to claim 1, wherein the compressor screen includes a circumferential surface mounted on the outer circumferential surface of one of the compressor disks or the inner circumferential surface of the compressor casing.

10. The compressor according to claim 1, wherein the compressor screen is fixed to the compressor casing.

11. The compressor according to claim 10, wherein the compressor screen has a radial width smaller than a length of an adjacent compressor vane of the plurality of compressor vanes.

12. The compressor according to claim 10, wherein the compressor screen has an inner periphery tapered in a flow direction of the compressed air such that the inner periphery has a decreasing width in a radial direction of the compressor and is widest toward the compressor casing.

13. The compressor according to claim 10, wherein the compressor screen includes a plurality of segments respectively installed on the inner circumferential surface of the compressor casing.

14. The compressor according to claim 10, wherein the plurality of openings are formed according to a pattern, the openings increasing in size toward an outer periphery of the compressor screen.

15. The compressor according to claim 1, wherein the compressor screen is fixed to a compressor disk of the plurality of compressor disks.

16. The compressor according to claim 15, wherein the compressor screen has a radial width smaller than a length of an adjacent compressor blade of the plurality of compressor blades.

17. The compressor according to claim 15, wherein the compressor screen has an outer periphery tapered in a flow direction of air.

18. The compressor according to claim 15, wherein the compressor screen includes a plurality of segments installed on the outer circumferential surface of the compressor disk of the plurality of compressor disks.

19. The compressor according to claim 15, wherein the plurality of openings are formed according to a pattern, the openings increasing in size toward an inner periphery of the compressor screen.

20. A gas turbine comprising:
a compressor configured to compress air;
a combustor configured to mix compressed air introduced from the compressor with fuel for combustion; and
a turbine configured to rotate by combustion gas generated in the combustor to generate power,
wherein the compressor comprises:
a compressor casing in which a plurality of compressor disks are installed;
a plurality of compressor blades fixed to an outer circumferential surface of each compressor disk so as to be arranged in rows facing an inner circumferential surface of the compressor casing,
wherein at least one cooling passage formed in the plurality of compressor disks is in fluid communication with the compressed air;
a plurality of compressor vanes fixed to the inner circumferential surface of the compressor casing and arranged in rows interlacing the compressor blades rows;
a compressor screen that includes an annular plate disposed between adjacently arranged rows of the compressor vanes and the compressor blades; and
a plurality of openings formed through the annular plate and configured to pass a portion of the compressed air from an upstream side of the compressor screen to a downstream side of the compressor screen.

* * * * *